Patented Apr. 6, 1943

2,315,679

UNITED STATES PATENT OFFICE 2,315,679

PROCESS FOR THE PREPARATION OF THE CYANHYDRIN OF FORMISOBUTYRALDOL

Kurt Warnat, Basel, Switzerland, assignor to Hoffmann-La Roche Inc., Nutley, N. J., a corporation of New Jersey No Drawing. Application March 10, 1941, Serial No. 382,672. In Switzerland April 24, 1940

2 Claims. (Cl. 260—464)

$\alpha$-Hydroxy-$\beta,\beta$-dimethyl-$\gamma$-butyrolactone, an important material in the synthesis of pantothenic acid, was first prepared by Glaser (Monatshefte für Chemie, vol. 25, year 1904, page 47) by the action of hydrocyanic acid on formisobutyraldol and saponification of the resulting cyanhydrin. Later, Kohn and Neustädter (Monatshefte für Chemie, vol. 39, year 1918, page 296) improved this synthesis by reacting the bisulphite compound of aldol with potassium cyanide. Thus, Kohn and Neustädter obtained from 80 grams and 93 grams of aldol 50 grams and 65 grams of $\alpha$-hydroxy-$\beta,\beta$-dimethyl-$\gamma$-butyrolactone, respectively, i. e., 49 and 55 per cent of the theoretical, respectively.

It has now been found that substantially higher yields of the lactone, amounting to about 90 per cent of the theoretical, can be obtained by changing the directions of Kohn and Neustädter and effecting the addition of hydrocyanic acid without cooling at about 30–70° C. This result is surprising since Kohn and Neustädter emphasize that the reaction of the bisulphite compound with the cyanide must be carried out with efficient cooling.

Example 51 grams ($\frac{1}{2}$ mol) of formisobutyraldol are dissolved in a solution of $\frac{7}{10}$ mol of sodium-bisulphite while heating. The almost clear solution is then cooled to 10–15° C., a solution of 28–30 grams of sodium-cyanide in 70 cc. of water poured into it rapidly without further cooling and shaken immediately. A homogeneous solution is obtained which spontaneously reaches a temperature exceeding 30° C. and from which an oily layer separates after a short time. The oil is removed and the aqueous solution which still has a temperature of 25–30° C is three times extracted with 100 cc. of ether. The resulting cyanhydrin and the ether are added to 80 cc. of concentrated hydrochloric acid while cooling and the product, after standing for a while, heated for 1 to 2 hours on a steam bath. After cooling, the acid solution is treated with 50 grams of potassium carbonate and a little ice. The product is then shaken 8 times with 100 cc. of amylene hydrate each time, the amylene hydrate dried and evaporated in vacuo. The residue is distilled in vacuo. 57 grams of $\alpha$-hydroxy-$\beta,\beta$-dimethyl-$\gamma$-butyrolactone are obtained, i. e., 90 per cent of the theoretical. The lactone boils at 122–125° C. at a pressure of 12–14 mm.

I claim:

1. In a process for the preparation of the cyanhydrin of formisobutyraldol, the steps which comprise bringing a solution of formisobutyraldol-bisulphite to a temperature of approximately 10°–15° C., adding thereto a water soluble cyanide under such conditions as to cause the temperature to rise immediately and spontaneously to between about 30°–70° C., and permitting the reaction to proceed to completion within such temperature range.

2. The process recited in claim 1 in which the added agent is sodium cyanide.

KURT WARNAT.